3,112,245
Patented Nov. 26, 1963

3,112,245
THERAPEUTIC d-ORTHO-MENTHATRIENE
1(7),5,8-OL-3
Yves-Rene Naves, Chemin des Erables, Geneva, Switzerland, and Fernand Caujolle, Toulouse, France, assignors to The Givaudan Corporation, New York, N.Y., a corporation of New Jersey
No Drawing. Filed July 13, 1960, Ser. No. 42,500
Claims priority, application Switzerland July 18, 1959
10 Claims. (Cl. 167—67)

The present invention has for its object the preparation of a novel physiologically active product and compositions made therewith.

The novel process comprises the separation of the acetate of one of the ortho-1(7),5,8-menthatriene-3-ol stereoisomers from the essential oil of carquéja under conditions preventing oxidation, then hydrolyzing the resulting acetate and isolating the product of hydrolysis, (+)-ortho-1(7),5,8-menthatriene-3-ol called carquéjol, in accordance with known methods.

It has been found that the commercial essential oil of carquéja which comes from Brazil usually contains 50 to 55% of carquéjol acetate accompanied by a small amount (at most, 6 to 7%) of carquéjol mixed with its isomers. By isomers are included also those ortho-1(7), 5,8-menthatriene-3-ol stereoisomers isomeric in the 2,3 positions of the ring, as well as the levo and racemic forms.

It is known that the hydrolysis of esters contained in the essential of crude carquéja gives, in the absence of special conditions, a mixture of different products which are difficult to separate and which easily undergo changes during the course of separation. Carquéjol, for example, easily is transformed into certain substances with the loss of two hydrogen atoms, one of these substances being 2-isopropenyl-3-methylphenol, especially when carquéjol is heated in the presence of substances such as hydroperoxides or peroxides; these substances form during the course of the air oxidation of the essential oil of carquéja and are found in commercial essential oil of carquéja. Carquéjol acetate is relatively much more stable than carquéjol and can be distilled under reduced pressure, in an atmosphere of inert gas, without notable alteration.

Thus, if essential oil of carquéja is hydrolyzed and one tries to isolate carquéjol the neutral products one encounters lead to great difficulties due to the presence of isomers of carquéjol in the essential oil and due to the transformation of carquéjol during the course of the prolonged treatments necessary to isolate the complex mixtures.

In accordance with the present invention, it has been possible to obtain carquéjol in purity suitable for use as a pharmaceutical substance because of its physiological activity. The process for obtaining the carquéjol in such purity involves (1) the elimination of hydroperoxides and peroxides present in the essential oil of carquéja, (2) separating the acetate of ortho-1(7),5,8-menthatriene-3-ol from the so-purified oil of carquéja; (3) distilling, preferably in the presence of an inert gas and under reduced pressure, (4) hydrolyzing the isolated ester in the presence of an inert gas, and (5) isolating the carquéjol by fractional distillation, preferably under reduced pressure in the presence of an inert gas, under conditions which preserve the stability of the new product.

Carquéjol obtained in accordance with the present invention has physiological properties which make it suitable for therapeutic purposes. It is very effective as an antipyretic agent. It increases the activity of known hypnotics by prolonging the duration or intensity of the effectiveness of the usual doses of hypnotics, or by reducing the usual dosage of hypnotics without loss in duration or intensity of the narcosis. Carquéjol, as provided by this invention, is also effective, whether administered orally or parenterally, as a potentiation agent for centrally acting analgesics such as codeine. Codeine, in combination with carquéjol, is as effective as morphine.

The following examples illustrate the process for preparing physiologically active carquéjol and are by way of illustration, not limitation.

EXAMPLE I

Essential oil of carquéja (18,950 grams), having the following analytical constants:

| | |
|---|---|
| $d_4^{20}$ | 0.9364 |
| $n_D^{20}$ | 1.4931 |
| $\alpha_D$ | +127°, 30 |
| Acid value | 2.8 |
| Ester value | 148.4 | was freed from hydroperoxides and peroxides by agitation at room temperature (about 25° C.) for 5 minutes with an aqueous 5 percent by weight solution of sodium sulfite. The product was washed with water, neutralized, dried and then distilled, by means of a column having a capacity of 25–30 theoretical plates, in an atmosphere of $CO_2$ gas, under a pressure of 15 mm. of mercury until the terpenes had been eliminated, and then under a pressure of 0.5 to 3 mm.

After several repeated distillations of the intermediate fractions 7,800 grams of carquéjol acetate was obtained. It had the following properties:

| | |
|---|---|
| Boiling point | 82–84° C. (5 mm. Hg). |
| $d_4^{20}$ | 0.995. |
| $n_D^{20}$ | 1.4884. |
| $\alpha_D$ | At least +275°. |
| Ester value | 296.0. |

The foregoing ester was hydrolyzed (saponified) at room temperature under a nitrogen atmosphere. To the solution obtained by mixing 2,800 grams of an aqueous solution (50% by weight) of potassium hydroxide and 3,750 grams of methanol was added 3,280 grams of the foregoing ester. After standing for 15 hours, acetic acid was added until the contents were neutral to litmus and the contents were then distilled on a water-bath to remove the major part of methanol. The neutral fractions were extracted from the cooled residue by means of petroleum ether distilling between 60 and 80° C. There was thus obtained 2,656 grams of crude carquéjol.

EXAMPLE II

One may shorten the duration of the operations by proceeding as follows:

The acetate of carquéjol (3,100 grams) obtained as in Example I was added to a mixture of 3,300 grams of aqueous sodium hydroxide (30% by weight) and 6,000 grams of methanol and the entire contents are refluxed under nitrogen for 30 minutes. The contents are then neutralized with acetic acid, distilled on a water-bath, and the neutral fractions were extracted from the cooled residue, all as in Example I. There was obtained 2,350 grams of crude carquéjol.

The crude carquéjol obtained in accordance with either Example I or Example II was fractionated in an atmosphere of $CO_2$ by distillation and repeated distillations under 0.5 to 1 mm. of Hg in a column having the efficiency of 25 to 30 theoretical plates, so that a product having the following characteristics was obtained:

| | |
|---|---|
| Boiling point | 50°–51° C. (0.5 mm. Hg). |
| $d_4^{20}$ | 0.970. |
| $n_D^{20}$ | 1.5103. |
| Congealing point | 37° C. |
| $[\alpha]_D^{20}$ (methanol; c.=0.1) | +315° at least. |

The density and index of refraction values were obtained on the product in supercooled condition.

The purified product, in solution in ethanol (95–96%), shows a maximum absorption for a wave length under 220 mμ and with a shoulder at 274 mμ with a coefficient of molecular extinction, ε, of 280.

Its infrared absorption spectrum is practically free of absorption bands with wave numbers of 1572 and 742 cm.$^{-1}$. It is characterized between 6 and 15μ by absorption bands with wave numbers of 1634, 1064, 984, 895, 846, 829, 768 and 724 cm.$^{-1}$.

The yield of purified product compared with crude carquéjol is 2,160 grams on 2,565 grams (84%) for Example I and 2,030 grams on 2,350 grams of crude (86.5%) for Example II.

The purified carquéjol exhibited physiological activity in various tests on animals summarized below:

(1) Tolerance

Tests on mice show that the immediate effects of toxic doses of carquéjol manifest themselves in an unsteadiness and narcosis of short duration. After this brief period, the animals regain their mobility and their entire sensibility. If the injected dose is lethal, the animal goes progressively towards a terminal coma, becomes motionless, and appears to suffer no pain. If the injected dose is not lethal, the animal returns rapidly to its normal condition. In any case, the toxic effects (slight or lethal) are quick to show themselves. Carquéjol does not cause any untoward toxic effects in the surviving animals, who regain their normal faculties, growth and fertility. In brief, intoxication by carquéjol leaves no lasting ill effects.

In actual tests running over a period of 30 days, the carquéjol purified in accordance with this invention were used on pure white Swiss mice weighting 20±1 gram, the carquéjol being injected intraperitoneally in the form of a 10% solution in neutralized olive oil in one series, and being administered orally by means of a stomach tube in the form of a 33% solution in neutralized olive oil in the second series.

The table below gives a summary of the results obtained with 720 animals.

| | Intraperitoneal g./kg. of animal | Oral g./kg. of animal |
|---|---|---|
| Maximum dose never lethal | 0.30 | 0.50 |
| LD 50 | 0.46 | 1.80 |
| Minimum dose always lethal | 0.70 | 5.00 |

(2) Pharmacodynamic Activity

The symptons observed during the course of the administration of purified carquéjol are caused essentially by the action on the central nervous system.

(1) Carquéjol lowers the body temperature. It is important to note that this hypothermal activity manifests itself just as well after intraperitoneal injection as after ingestion.

Curves showing the effect on the rectal temperature after injection are characteristic of the observed effects. These show that the hypothermal effect is not only intense, but also of long duration. This antithermal power shows itself on normal animals. It is manifested even more on animals (rats) which are in a state of artifically-induced hypothermy. Carquéjol increases the antipyretic activity of various classic antipyretics.

As illustrations of the marked hypothermal effects, it is noted that the purified carquéjol of this invention, when administered intraperitoneally in a dose of 0.3 gram per kilogram, shows maximum effect (rectal temperature fall of 4.5° C.) in 30 to 40 minutes after injection. Duration of the hyperthermal effect exceeds 3 hours. In doses of 0.10 to 0.15 grams per kilogram, the observed rectal temperature fall is 3.2°. After oral administration, the maximum rectal temperature fall, always intense, is observed about one hour later.

(2) Carquéjol exhibits narcotic effects and possesses a true central analgesic power.

These narcotic central analgesic powers are exhibited in a strong manner when carquéjol is associated with hypnotics or analgesics which, by themselves, are weak in their action on the central nervous system.

(a) In the presence of small quantities of carquéjol, very small doses of hypnotics, inactive by themselves, aquire an efficacy, important and durable, which is equal to that manifested by these same hypnotics in massive doses, which however are precluded because of toxicity.

These facts have been established by experimentation with carquéjol mixed with paraldehyde, chloral, or barbiturates having aliphatic, cycloalkenyl or aromatic substituents. Surprisingly, increase in anticonvulsant power goes hand in hand with increase in hypnotic power in the special case of the mixture of carquéjol and phenobarbital.

Increase in the activity of hypnotics is realized with doses of carquéjol much below toxic levels.

(b) Carquéjol increases the activity of codeine to the point where the latter has an analgesic central potency equal, and in some respects superior (at least as to duration) to that of morphine. This increase in the activity of codeine is exceptionally strong and amounts to true synergism.

Carquéjol-codeine is always well tolerated and thus presents an efficacy superior to that of morphine. Furthermore, this efficacy is assured for a time longer than when morphine is used.

These statements are based on proved, classical pharmacodynamic tests: the test which measures absence of pain when the animal's tail is pinched and the test of paw burn by progressively increased heating above the tolerated threshold of the surface whereon the animal moves. Thus, if the temperature becomes intolerable, the animal flees. If the temperature known to be intolerable to a normal animal does not induce the treated animal to flee, it is evident that the burn induced pain is not felt by the treated animal.

The results of such tests on 260 animals are given below:

TEST OF PAIN INDUCED BY TAIL PINCHING DURATION OF ANALGESIA AFTER INTRAPERITONEAL INJECTION

| Injected Product g./kg. (Each product injected in 10 animals) | Order of Injection and Interval of Time Between the Injections | Lag in min. | Average Duration, in min. | | |
|---|---|---|---|---|---|
| | | | Partial Analgesia | Complete Analgesia | Partial Analgesia |
| Morphine 0.015 | | 6 | 3 | 123 (from 70 to 180) | 50. |
| Morphine 0.010 | | 10 | 5 | 105 (from 0 to 170) | 30. |
| Morphine 0.008 | | 8 to 12 | 8 | 83 (from 0 to 165) | 30. |
| Codeine 0.015 | | 3 | 2 | 11 (from 6 to 76) | 9. |
| Codeine 0.010 | | 3 | 11 | 18 (from 0 to 18) | 5. |
| Codeine 0.008 | | | 0 to 24 | 0 | |
| Codeine 0.006 | | | 0 to 16 | 0 | |
| Carquéjol 0.25 | | | 0 | 0 | 0. |
| Carquéjol 0.20 | | | 0 | 0 | 0. |
| Carquéjol 0.25 + Codeine 0.015 | Codeine + Carquéjol, 2 min | 11 | 14 | 90 (from 30 to 136) | 42. |
| Carquéjol 0.25 + Codeine 0.008 | Carquéjol + Codeine, 5 mn | 1 | 1 to 5 | 177 (from 100 to 215) | 15 to 20. |
| Carquéjol 0.20 + Codeine 0.008 | Carquéjol + Codeine, 5 mn | 10 to 12 | 0 to 3 | 111 (from 105 to 115) | 10 to 12. |
| Carquéjol 0.15 + Codeine 0.008 | Carquéjol + Codeine, 5 mn | 10 | 5 | 54 (from 30 to 70) | 10 to 15. |
| Carquéjol 0.10 + Codeine 0.008 | Carquéjol + Codeine, 5 mn | 10 | 5 | 45 (from 25 to 60) | 8 to 12. |
| Carquéjol 0.20 + Codeine 0.006 | Carquéjol + Codeine, 5 mn | | 0 to 15 | 33 (from 0 to 130) | |

TEST OF PAIN INDUCED BY BURNING PAWS

| Number of Animals | Product | g./kg. | Average Increase in Temperature Supported By Mice After Injection | | | |
|---|---|---|---|---|---|---|
| | | | After 15 min. | 45 min. | 90 min. | 120 min. |
| 25 | Morphine | 0.010 | 8.0 | 6.4 | 3.8 | |
| 25 | Codeine | 0.008 | 0.9 | 0 | 0 | 0 |
| 10 | Codeine | 0.006 | 0 | 0 | 0 | 0 |
| 10 | Carquéjol | 0.20 | 5.7 | 4.6 | 0.7 | 0 |
| 20 | Carquéjol | 0.15 | 5.2 | 4.9 | 0 | 0 |
| 10 | Carquéjol | 0.10 | 1.4 | 0 | 0 | 0 |
| 10 | Carquéjol | 0.08 | 0 | 0 | 0 | 0 |
| 10 | Carquéjol | 0.05 | 0 | 0 | 0 | 0 |
| | Carquéjol + Codeine | | They let themselves be burned without trying to escape, even at 70° C. | | | |
| 10 | 0.10 | 0.008 | 7.3 {7.8, 6.9} | 5.2 {6.1, 4.4} | 1.6 {2.3, 1.1} | 0.2 {0.4, 0} |
| 20 | 0.08 | 0.008 | 5.7 {6.3, 4.7} | 2.6 {3.3, 1.9} | 1.5 {3, 0} | 0.15 {0.3, 0} |
| 10 | 0.03 | 0.008 | 5.9 | 3.7 | 0 | 0 |
| 10 | 0.01 | 0.008 | 4.6 | 1.6 | 0 | 0 |
| 20 | 0.008 | 0.008 | 3.9 | 0.5 | 0 | 0 |
| 20 | 0.005 | 0.008 | 0 | 0 | 0 | 0 |
| 10 | 0.08 | 0.006 | 6.4 | 1.9 | 1.5 | 0.5 |
| 15 | 0.05 | 0.006 | 3.1 | 0.3 | 0.6 | 0.2 |
| 10 | 0.03 | 0.006 | 2.4 | 1.1 | 0 | 0 |
| 10 | 0.01 | 0.006 | 0 | 0 | 0 | 0 |
| 10 | 0.008 | 0.006 | 0 | 0 | 0 | 0 |

The foregoing illustrates the practice of this invention, which however, is not to be limited thereby, but is to be construed as broadly as permissible in view of the prior art and limited solely by the appended claims.

What is claimed is:

1. (+) - ortho - 1(7),5,8 - menthatriene-3-ol in purified form, having the following characteristics:

Boiling point _____ 50°–51° C. (0.5 mm. Hg).
$d_4^{20}$ _____ 0.970.
$n_D^{20}$ _____ 1.5103.
Congealing point _____ 37° C.
$(a)_D^{20}$ (methanol; c.=0.1) __ +315° at least.

infra-red absorption spectrum data: practically free of absorption bands with wave numbers of 1572 and 724 cm.$^{-1}$ and characterized between 6 and 15μ by absorption bands with wave numbers of 1634, 1064, 984, 895, 846, 829, 768 and 724 cm.$^{-1}$, and possessing antipyretic, narcotic, central analgesic powers and exhibiting a synergistic hypnotic effect when used in association with codeine.

2. As a new composition of matter, (+)-ortho-1(7),5,8-menthatriene-3-ol as defined in claim 1 and a member selected from the group consisting of codeine, paraldehyde, chloral and barbiturates.

3. As a new composition of matter, (+)-ortho-1(7),5,8-menthatriene-3-ol as defined in claim 1 and phenobarbital.

4. The process of obtaining narcotic and antipyretic effects which comprises administering (+)-ortho-1(7),-5,8-menthatriene-3-ol, as defined in claim 1, to a subject.

5. The process for preparing (+)-ortho-1(7),5,8-menthatriene-3-ol as defined in claim 1, which comprises separating the acetate of an ortho-1(7),5,8-menthatriene-3-ol stereoisomer from the essential oil of carquéja under oxidation-preventing conditions, hydrolyzing the thus-separated ester and isolating the thus-formed dextrorotatory carquéjol.

6. The process of claim 5 wherein hydroperoxides and peroxides are eliminated from said oil of carquéja prior to separating said acetate.

7. The process of claim 5 wherein said (+)-ortho-1(7),5,8-menthatriene-3-ol is isolated by fractional distillation.

8. The process of claim 5 wherein said hydrolyzing step is carried out by an alcoholic solution of sodium hydroxide.

9. The process of claim 5 wherein said hydrolyzing step is conducted in the presence of an inert gas.

10. The process of claim 5 wherein said (+)-ortho-1(7),5,8-menthatriene-3-ol is isolated by fractional distillation under reduced pressure and in the presence of an inert gas.

(References on following page)

References Cited in the file of this patent

Finer: Organic Chemistry, vol. 1, pages 47–63, 1959, Longmans, printed in England by Butter and Tanner Ltd., London.

Fieser et al.: Organic Chemistry, pages 270–272, 1944, Heath and Co., Boston, Mass., U.S.A.

Casparis: Chem. Abs. (1), 1932, vol. 26, page 3621 (2).

Crocco: Chem. Abs. (2), 1933, vol. 27, page 3033 (7).

Wasieky et al.: Chem. Abs. (3), 1945, vol. 39, page 5396 (b).

UNITED STATES PATENT OFFICE
CERTIFICATE OF CORRECTION

Patent No. 3,112,245                        November 26, 1963

Yves-Rene Naves et al.

It is hereby certified that error appears in the above numbered patent requiring correction and that the said Letters Patent should read as corrected below.

In the grant, line 1, and in the heading to the printed specification, line 4, before "Geneva", each occurrence, insert -- Petit-Lancy --; column 1, line 29, after "essential" insert -- oil --; column 2, line 25, strike out the comma and insert instead a period --; line 27, after "148.4" insert a comma; lines 46 to 51, strike out the periods after the numbers; column 3, lines 22 to 28, strike out the periods after the numbers; column 4, line 11, for "symptons" read -- symptoms --; column 5, lines 57 to 61, strike out the periods after the numbers; line 61, for "(methanol; c.=0.1)" read -- (methanol; c=0.1) --.

Signed and sealed this 1st day of September 1964.

(SEAL)
Attest:

ERNEST W. SWIDER                        EDWARD J. BRENNER
Attesting Officer                         Commissioner of Patents